United States Patent [19]

Viertel et al.

[11] 4,428,612

[45] Jan. 31, 1984

[54] SWIVEL MOUNT FOR A VEHICLE SUN-VISOR

[75] Inventors: Lothar Viertel, Saarlouis, Fed. Rep. of Germany; Alan Wrintmore, Creutzwald, France

[73] Assignee: Gebr. Happich GmbH, Fed. Rep. of Germany

[21] Appl. No.: 343,393

[22] Filed: Jan. 28, 1982

[30] Foreign Application Priority Data

Feb. 4, 1981 [DE] Fed. Rep. of Germany ....... 3103738

[51] Int. Cl.³ ............................................. B60J 3/02
[52] U.S. Cl. ................................. 296/97 K; 248/293; 24/563; 24/543
[58] Field of Search ............... 296/97 K, 97 R, 97 H; 403/155, 397; 248/291, 293; 160/DIG. 3; 24/255 SL, 255 R, 257 R, 259 FS, 259 R

[56] References Cited

U.S. PATENT DOCUMENTS

| | | | |
|---|---|---|---|
| 2,304,223 | 12/1942 | Visor | 403/52 |
| 3,472,549 | 10/1969 | Wiesmann | 296/97 K |
| 4,070,054 | 1/1978 | Cziptschirsch | 296/97 K |

FOREIGN PATENT DOCUMENTS

| | | |
|---|---|---|
| 44452 | 1/1982 | European Pat. Off. . |
| 2551633 | 5/1977 | Fed. Rep. of Germany . |
| 3021984 | 6/1980 | Fed. Rep. of Germany . |
| 2431931 | 7/1978 | France . |
| 2450709 | 3/1979 | France . |
| 2458415 | 6/1979 | France . |
| 1354485 | 5/1974 | United Kingdom . |
| 1452220 | 10/1976 | United Kingdom ............ 296/97 H |

Primary Examiner—Robert B. Reeves
Assistant Examiner—Dennis H. Pedder
Attorney, Agent, or Firm—Ostrolenk, Faber, Gerb & Soffen

[57] ABSTRACT

The disclosure concerns a swivel mount for the sun visor of an automotive vehicle. There is a mount housing including a tubular part that passes around the mounting shaft of the sun visor and a part that extends away from that shaft receiving part of the mount housing. The mount housing might be an integral molding or a bent sheet metal part. A cutout is defined along the length of the mount housing for receiving a detent spring therein. The cutout includes a web that divides the cutout into a top part near the mounting shaft and a bottom part. An end stop is located near the bottom of the mount housing. The reinforcing insert for the visor body might extend through the mount housing and define the end stop. The detent spring is U-shaped, with one arm passing down the outside of the cutout web and the end stop at one side of the mount housing. The other arm of the detent spring extends down past the opposite side of the cutout web at the opposite side of the mount housing, through the lower cutout in the mount housing and then wraps around the end stop at the first side of the mount housing, thereby locking the detent spring to the mount housing. The detent spring might have the end of the other arm thereof folded for resiliently snapping onto the end stop.

13 Claims, 7 Drawing Figures

U.S. Patent   Jan. 31, 1984   Sheet 1 of 2   4,428,612
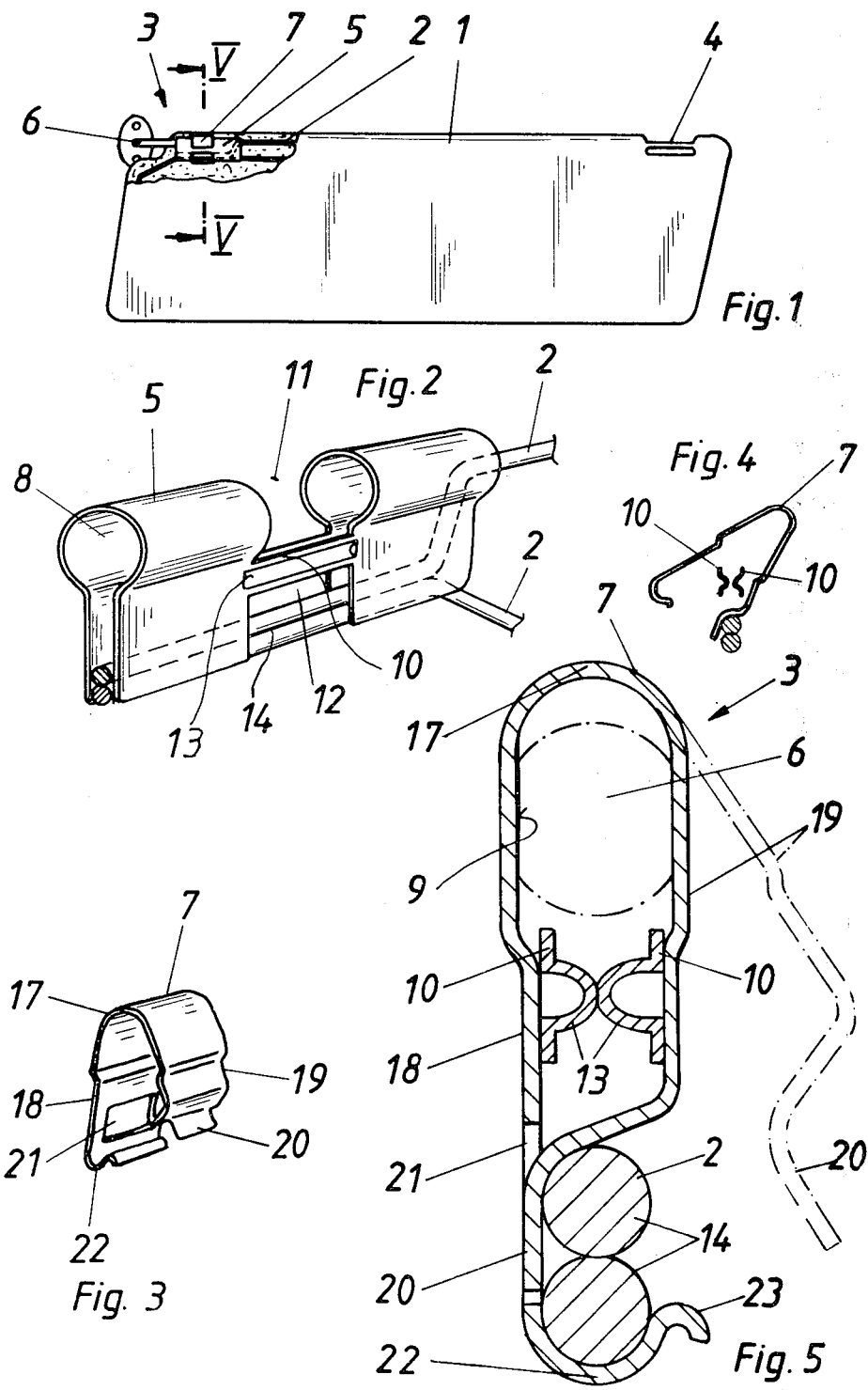

SWIVEL MOUNT FOR A VEHICLE SUN-VISOR

BACKGROUND OF THE INVENTION

The present invention relates to a swivel mount for the sun visor of an automotive vehicle and particularly a swivel mount which squeezes on the mounting shaft of the sun visor.

German Pat. No. 25 51 633 describes a swivel mount for a sun visor which includes a mounting body, a mounting shaft and a U-shaped leaf spring on the mounting body which grips around the shaft. The free ends of the arms of the spring are hooked together by extensions of its arms, one extension comprising a hook formed by a double bend, and the other extension comprising a V-shaped spring extending transverse to the direction of the arm with the inversion thereof directed toward the opposite arm. The free end of the V-shaped spring engages behind the hook on the other arm. The hook development prevents the free ends of the arms of the U-shaped leaf spring from spreading apart. The distance between the arms of the leaf spring must, however, be kept greater than required by the thickness of the housing. Otherwise, the hooked elements could not be brought into engagement. Thus, the leaf spring is seated relatively loosely on the mount housing. Particularly together with errors in tolerance, this may cause crackling or clicking noises upon swinging of the sun visor body.

SUMMARY OF THE INVENTION

The object of the invention is to improve the quality of the swivel mount and to develop its individual elements so that they are simple and economical to manufacture and mount. In particular, an absolutely firm seat of the detent spring is to be assured.

The swivel mount of the invention is mounted at the upper corner of the sun visor body. It includes a mount housing, comprised of a part which engages the mounting shaft and swings thereabout and includes a portion that extends away from the mounting shaft. Intermediate the length of the mount housing along the mounting shaft, a cutout is defined extending from the part of the mount housing on the mounting shaft down toward the opposite edge of the mount housing. A detent spring, described below, is positioned in the cutout. The cutout itself is divided by a cutout web that extends across the cutout, in a direction generally along or parallel to the mounting shaft. This divides the cutout into an upper cutout section toward the mouting shaft and a lower cutout section at the opposite side of the cutout web. Toward the end of the mount housing away from the mounting shaft, an end stop is provided in the cutout opening. This may comprise an additional cutout web extending generally parallel to the first mentioned cutout web.

The U-shaped detent spring includes a web which is wrapped around the mounting shaft in the cutout and includes two arms which extend down from the web of the spring. One arm of the spring extends down the outside of the mount housing past one outside face of the cutout web and the corresponding outside face of the end stop. The other arm of the detent spring extends past the opposite outside face of the cutout web, then through the lower cutout and past the same first side of the end stop as the other spring arm passes. This holds the detent spring in place. To facilitate the passage of the second arm through the lower cutout and then behind the end stop, that arm of the spring is generally crank shaped.

The swivel mount of the invention is relatively simple to manufacture and the individual parts are adapted to each other to permit easy installation. In particular, the detent spring, which is developed without sharp bends, or the like, is reliably held fast and positioned such that no crackling or similar noises should occur upon the swinging of the body or the sun visor. The free end region of the first mentioned arm of the spring (the arm which does not pass through the lower cutout) is shaped as a spring hook which can be resiliently snapped onto and off the end stop for locking that arm to the end stop and the mount housing. This makes it possible to hold the detent spring fast by simply clipping it on the mount housing.

The first mentioned arm may have a window-like cutout defined in it shaped so that the free end region of the other arm may extend into it or even through it. As a result, the two arms of the detent spring can extend through their overlapping region in coincidence with each other and they thereby do not emerge out of the plane of the mount housing.

The mount housing may be a simple integral piece, including the cutout web and the end stop. Furthermore, a reinforcing lattice frame may be provided in the entire body and for the mount housing, and this may be integrated in the mount housing as well. This permits a particularly economical development of the mount housing with a full reinforcing insert for the body of the sun visor. This is further optimized by forming the integral mount housing of a plastic injection molding.

In another embodiment of the invention, the mount housing is comprised of a stamped sheet metal part that is bent around the mounting shaft and therefore has two generally parallel plates, giving the mount housing a keyhole shaped cross-section. In this embodiment, the cutout web is comprised of two web sections, each on a respective plate of the mount housing. These web sections lie behind one another and are coincident. A wire insert may be used to reinforce the sun visor body and the mount housing. The end stop may comprise at least one region of the wire insert which extends through the mount housing. This is beneficial in that it utilizes the wire insert which is in any event present in various sun visors in order to tension the detent spring and hold it fast on the mount housing.

The individual cutout web sections may be developed with stiffening beads which stiffen the web sections and also stiffen the mount housing. This permits forming the mount housing of relatively thin metal sheet and nevertheless assuring sufficient strength.

The exposed areas of the mount housing may be rounded, such as the portion of the mount housing surrounding the mounting shaft, and may be rounded with curvatures of a radius of at least 3.2 mm., which is a minimum curvature radius set by certain governments. This provides assurance that the swivel mount housing does not have any sharp edges and therefore cannot constitute a risk of injury.

Other objects and features of the invention will be described below with reference to the embodiments shown in the accompanying drawings.

BRIEF DESCRIPTION OF THE DRAWINGS

FIG. 1 shows a sun-visor body cut open in the region of the swivel mount and showing the mount housing;

FIG. 2 shows a first embodiment of the mount housing on a larger scale than in FIG. 1;

FIG. 3 shows the detent spring which forms part of the swivel mount;

FIG. 4 shows the installed position of the detent spring;

FIG. 5 is a vertical section, approximately along the line V—V of FIG. 1, through a completely mounted swivel mount, on a greatly enlarged scale;

DESCRIPTION OF THE PREFERRED EMBODIMENTS

Figure 6:
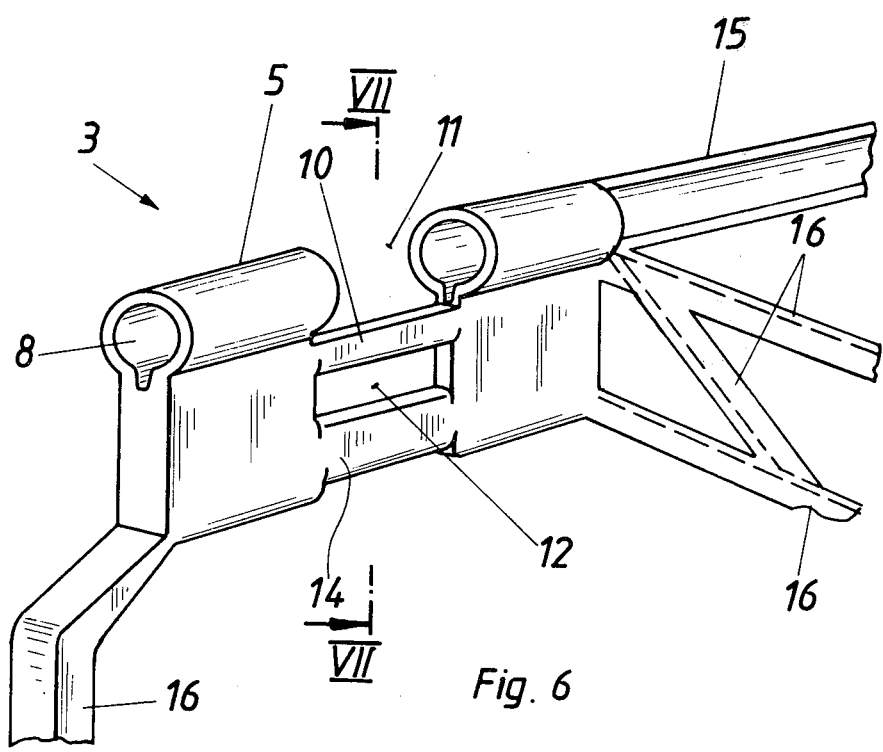
FIG. 6 shows a second embodiment of the mount housing.

FIG. 1 shows a sun-visor body 1 which is formed of a material having cushioning properties and which is stiffened by an incorporated wire insert 2 that is shaped to define a frame for the visor body. For the swingable arrangement of the sun-visor body 1 in a vehicle, a swivel mount 3 and an outer support pin 4 for cooperating with a mounting block (not shown) are provided.

The swivel mount 3 is comprised of a mount housing 5, a mounting shaft 6 and a detent spring 7 which contracts radially onto the shaft 6. The mount housing 5, in accordance with FIGS. 1, 2 and 4, 5, is formed from a sheet-metal blank which is doubled by bending it in its center to have an approximately keyhole like final cross-sectional shape. A tube-like mounting hole 8 is formed and it receives the mounting shaft 6. The shaft has at least one flat 9 that engages the interior of the spring 7 located in the housing 5 inside the hole 8 and thereby prevents relative rotation of the shaft 6 and the housing 5. The mounting hole 8 is interrupted in its central region along the shaft by a cutout in the housing which extends across the hole 8. The cutout is long enough along the hole 8 to contain the spring 7 which acts on the mounting shaft 6.

Spaced from the mounting shaft 6 and extending parallel to it, the mount housing 5 includes a cutout web 10, which is divided by the doubling over of the metal material into two individual webs 10 lying in coincidence one behind the other and provided with stiffening beads 13. By means of the web 10, or individual webs 10, the housing cutout is divided into an upper cutout 11 at the hole 8 and a lower cutout 12 at the bottom of the housing. The upper cutout 11 is open at its top edge, while the lower cutout 12 is limited toward the bottom by an end stop 14. The end stop 14 is defined by regions of the wire insert 2, which is connected firmly, for instance by welding, to the mount housing 5.

Figure 7:
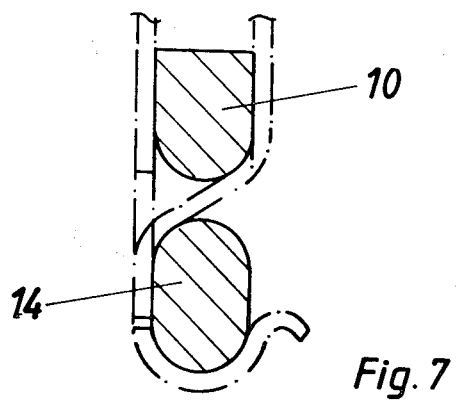
FIG. 7 shows a section along the line VII—VII of FIG. 6.

In the embodiment of FIGS. 6 and 7, the mount housing 5 is comprised of a single-piece plastic injection molding having a mounting hole 8, a web 10 which divides the housing cutout into an upper cutout 11 and a lower cutout 12 and an end stop 14 which limits the lower housing cutout 12. The mount housing 5 is preferably a single piece with a lattice frame 15 which forms a stiffening insert for the sun visor body 1. That frame includes the branches 16.

In both embodiments, the mount housing comprises an essentially closed, hollow body with outer rounding radii at the mounting shaft and the corners of at least 3.2 mm.

FIG. 3 shows the detent spring 7 before installation. The spring 7 is of approximately U-shape with two arms 18, 19 connected together by a web 17 which is suitably rounded corresponding to the radius of the mounting shaft 6. The arm 19 has a region of stepped arcuate shape, which in use provides a resting surface for the arm 19 on the end stop 14 and provides a resting surface for the free end region 20 on the side of the end stop 14 against which the other arm 18 of the detent spring 7 also comes to rest. In use, the free narrow end region 20 is received in a window-like cutout 21 in the arm 18. The arm 18 of the detent spring 7 is provided at its free end region with an open spring hook 22 which can be clipped over the lower side of the end stop 14. In order to facilitate this clipping, the spring hook 22 is provided at its end with a tongue 23 which is rounded toward the outside and in the direction opposite to the curvature of the spring hook 22. The bottom of the end stop 14 is also rounded, preferably with a radius which corresponds to that of the spring hook 22.

To install the detent spring 7, it is oriented in an oblique position, as shown in FIG. 4, and moved toward the mount housing. The free end region 20 of the arm 19 is placed into the lower cutout 12 of the mount housing 5. When the bent region rests on the end stop 14, the detent spring 7 is swung into a vertical position until the inside of the arm 19 rests against the web 10 and the spring arms rest against the shaft 6. Then, possibly with the use of a push pin or the like, the clip connection is produced between the spring hook 22, which widens elastically upon the clipping process, and the end stop 14. Then the spring is mounted as in FIG. 5.

Although the present invention has been described in connection with a plurality of preferred embodiments thereof, many variations and modifications will now become apparent to those skilled in the art. It is preferred, therefore, that the present invention be limited not by the specific disclosure herein, but only by the appended claims.

What is claimed is:

1. A swivel mount for the sun visor of an automotive vehicle, comprising:

a mount housing for being clamped to a mounting shaft for the sun visor on the vehicle; the housing comprising a first part for engaging the mounting shaft and a second part extending away from the first part and away from the mounting shaft to an edge of the mount housing remote from the mounting shaft;

a cutout defined in the housing at a place along the shaft; the cutout extending from the first part of the housing toward the remote edge of the housing; the cutout being for receiving a detent spring;

a cutout web defined in the second part of the mount housing and extending across the cutout, and being positioned to divide the cutout into an upper cutout, which has an open edge at the first part of the mount housing and a lower cutout to the other side of the cutout web and extending toward the remote edge of the mount housing; an end stop spaced from the cutout web in the cutout and located nearer to the remote edge of the housing than the cutout web; the cutout web having a first outwardly facing side at one side of the mount housing and a second outwardly facing side at the opposite side of the mount housing;

a detent spring positioned at the cutout; the spring having a spring web which is wrapped around the mounting shaft for radially clamping to the mounting shaft; the spring including two arms, which extend away from the spring web in generally the same direction, whereby the spring is generally U-shaped;

one spring arm extending from the spring web around the mounting shaft past the first outwardly facing side of the cutout web at one side of the mount housing and past a first outwardly facing side of the end stop at the one side of the mount housing;

the other arm of the spring extending from the spring web past the outwardly facing second side of the cutout web at the opposite side of the mount housing, across the lower cutout and also alongside and in contact with the first outwardly facing side of the end stop.

2. The sun visor swivel mount of claim 1, wherein the one arm of the spring includes a window-like cutout for receiving therein the region of the other arm which has passed across the lower cutout and alongside and in contact with the first side of the end stop.

3. The swivel mount of claim 1, wherein the mount housing comprises an essentially closed, hollow body with outer rounding radii of at least 3.2 mm.

4. The sum visor swivel mount of claim 1, wherein the cutout web and the end stop extend generally parallel to the mounting shaft.

5. The sun visor swivel mount of either of claims 1 or 4, wherein the mount housing is an integral unit including the cutout web and the end stop; a lattice frame being provided for stiffening the sun visor and the lattice frame also being integral with the mount housing.

6. The sun visor swivel mount of claim 5, wherein the mount housing and the lattice frame are a plastic injection molding.

7. The sun visor swivel mount of either of claims 1 or 4, wherein the mount housing comprises a stamped, folded sheet-metal part which is folded around the mounting shaft; the second part of the mount housing comprises a pair of opposing plates extending in generally the same direction away from the first part of the mount housing, giving the mount housing a generally keyhole shaped cross-section;

a reinforcing insert being provided for stiffening the visor, being firmly connected to the mount housing and the insert including a section thereof passing through the mount housing and defining the end stop.

8. The sun visor swivel mount of claim 7, wherein the cutout web comprises a respective web section supported on each mount housing plate and the web sections lie behind each other and are in coincidence.

9. The sun visor swivel mount of claim 8, wherein each cutout web section includes a respective stiffening bead extending the length of that web section.

10. The sun visor swivel mount of claim 1, wherein the other arm of the spring is generally crank-shaped.

11. The sun visor swivel mount of either of claims 1 or 10, wherein the region of the one arm of the spring that is away from the web of the spring comprises a spring hook which resiliently engages and is disengageable from the end stop.

12. The sun visor swivel mount of claim 11, wherein the one arm of the spring includes a window-like cutout for receiving therein the edge region of the other arm.

13. The sun visor swivel mount of claim 11, wherein the mount housing comprises a stamped, folded sheet-metal part which is folded around the mounting shaft; the second part of the mount housing comprises a pair of opposing plates extending in generally the same direction away from the first part of the mount housing, giving the mount housing a generally keyhole shaped cross-section;

a reinforcing insert being provided for stiffening the visor, being firmly connected to the mount housing and the insert including a section thereof passing through the mount housing and defining the end stop.

* * * * *